(12) United States Patent
Wang et al.

(10) Patent No.: US 10,116,202 B2
(45) Date of Patent: Oct. 30, 2018

(54) ADAPTIVE CLAMPING CIRCUITRY

(71) Applicant: Fairchild Semiconductor Corporation, Sunnyvale, CA (US)

(72) Inventors: Xiaopeng Wang, San Jose, CA (US); Kaiwei Yao, San Jose, CA (US)

(73) Assignee: Fairchild Semiconductor Corporation, Phoenix, AZ (US)

( * ) Notice: Subject to any disclaimer, the term of this patent is extended or adjusted under 35 U.S.C. 154(b) by 0 days.

(21) Appl. No.: 15/195,289

(22) Filed: Jun. 28, 2016

(65) Prior Publication Data

US 2017/0012545 A1 Jan. 12, 2017

Related U.S. Application Data (60) Provisional application No. 62/189,482, filed on Jul. 7, 2015.

(51) Int. Cl.
 *H02M 3/335* (2006.01)
 *H02M 1/32* (2007.01)
 *H02M 3/337* (2006.01)
 *H02M 1/34* (2007.01)

(52) U.S. Cl.
 CPC ............... *H02M 1/32* (2013.01); *H02M 1/34* (2013.01); *H02M 3/3376* (2013.01); *H02M 3/33592* (2013.01); *Y02B 70/1475* (2013.01)

(58) Field of Classification Search
 CPC ............. H02M 3/335; H02M 3/33576; H02M 3/33592; H02M 7/21; H02M 7/217; H02M 7/219; H02M 1/32
 See application file for complete search history.

(56) References Cited

U.S. PATENT DOCUMENTS

| 6,181,877 B1* | 1/2001 | Yoshida | G01C 3/08 356/3.04 |
| 6,452,817 B1* | 9/2002 | Yasumura | H02M 1/40 363/19 |
| 6,469,915 B2 | 10/2002 | Huang et al. | |
| 2014/0133200 A1* | 5/2014 | Sun | H02M 1/34 363/50 |
| 2014/0334189 A1* | 11/2014 | Yan | H02M 3/33584 363/17 |
| 2015/0055418 A1* | 2/2015 | Murakami | G11C 16/24 365/185.21 |
| 2015/0311913 A1* | 10/2015 | Pan | H03M 1/1245 341/156 |

FOREIGN PATENT DOCUMENTS

CN 203537221 U 4/2014

* cited by examiner

*Primary Examiner* — Gary L Laxton
(74) *Attorney, Agent, or Firm* — Dickinson Wright PLLC (57) ABSTRACT

A DC/DC power supply system includes a primary side and a secondary side to generate an output DC voltage from an input DC voltage. The power supply also includes adaptive clamping circuitry that generates an adjustable clamping voltage and/or current to limit a Vds breakdown voltage for switches of the secondary side.

18 Claims, 5 Drawing Sheets

ADAPTIVE CLAMPING CIRCUITRY

CROSS REFERENCE TO RELATED APPLICATIONS

This application claims the benefit of U.S. Provisional Patent Application Ser. No. 62/189,482, filed Jul. 7, 2015, the entire content of which is incorporated herein by reference.

FIELD

The present disclosure relates to adaptive clamping circuitry.

BACKGROUND

In full bridge DC-DC power conversion architectures, one major challenge is that the maximum magnitude of low frequency oscillation on the secondary side should not exceed the drain-source breakdown voltage (Vds) of the power switch devices. The same challenge applies to half bridge DC-DC power conversion architectures. For most applications, a Resister-Diode-Capacitor (RDC) clamping circuit is an effective way to damp the oscillation magnitude without interruption of the regulation loop. The RDC clamping circuit is typically implemented on a power supply printed circuit board (PCB) using discrete components. For applications with a wide range of input voltages, such as telecommunication requiring 36-72V input voltage, the RDC clamping circuit design has to take the worst case into consideration so that the power switch devices will not experience Vds breakdown. As a result, the components making up the RDC clamping circuit have to be far larger than what required in most applications. Also, the generated power loss is larger than necessary, which may impact efficiency and thermal performance.

BRIEF DESCRIPTION OF DRAWINGS

Features and advantages of the claimed subject matter will be apparent from the following detailed description of embodiments consistent therewith, which description should be considered with reference to the accompanying drawings, wherein:

Although the following Detailed Description will proceed with reference being made to illustrative embodiments, many alternatives, modifications, and variations thereof will be apparent to those skilled in the art.

DETAILED DESCRIPTION

Figure 1:
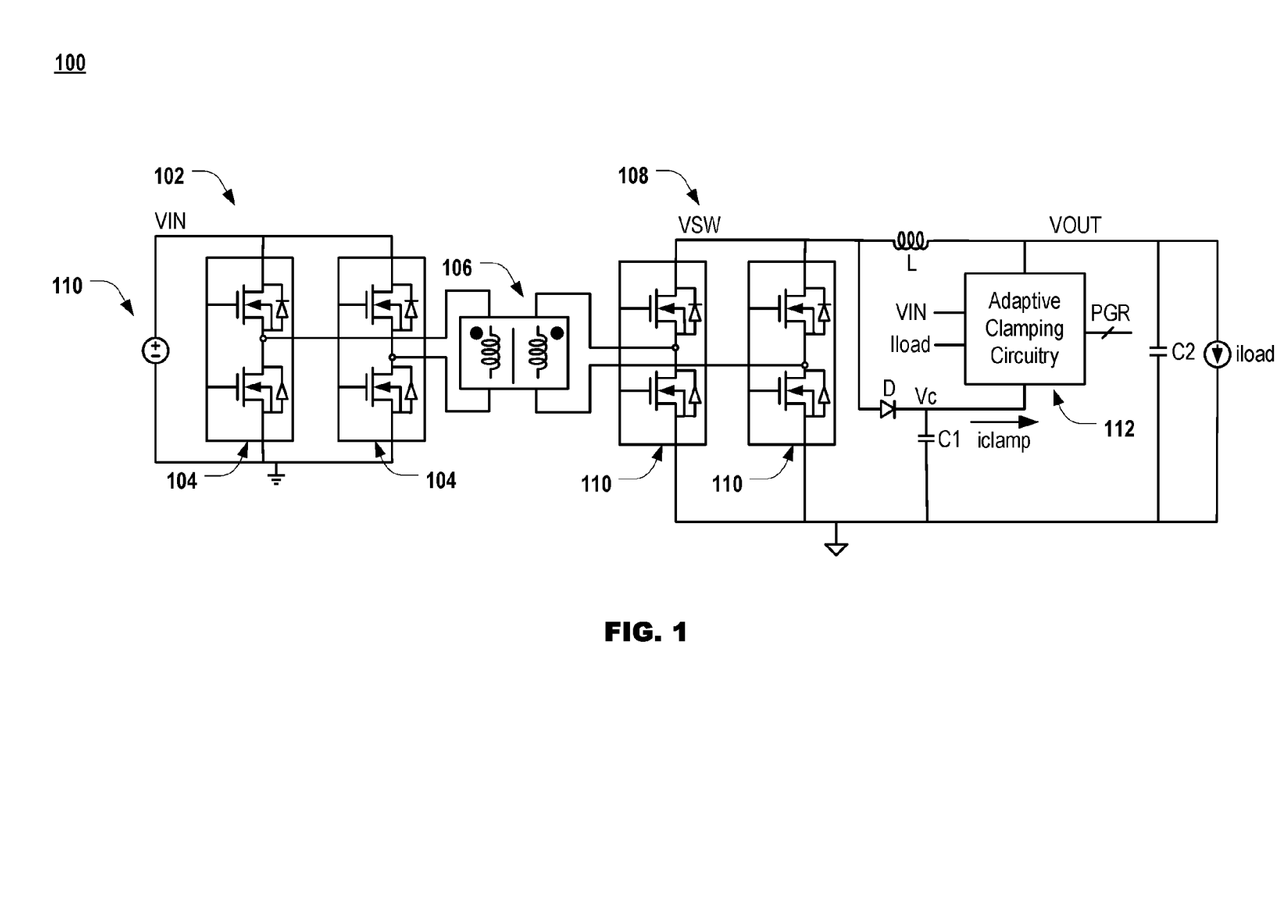
FIG. 1 illustrates a power supply system consistent with several embodiments of the present disclosure.

FIG. 1 illustrates a power supply system 100 consistent with several embodiments of the present disclosure. The power supply system 100 of this example is a full-bridge topology that is generally configured to generate a DC voltage Vout from an input DC voltage source Vin. The system includes a primary side 102 that includes a plurality of primary side power switches 104, transformer circuitry 106, a secondary side 108 that includes secondary side power switches 110, and adaptive clamping circuitry 112. The circuitry of the secondary side 108 may also comprise an inductor L, a diode D and capacitors C1 and C2 in a configuration that may be customary or known for a DC-DC converter. In this example, the primary side power switches 104 and the secondary side power switches 110 each includes four controllable power switches arranged in a full bridge configuration to generate a controllable DC output voltage Vout from an input DC voltage source Vin. The operation of the switches of the primary side 102 and secondary side circuitry 108, via transformer circuitry 104, are each well known, and may include, for example, pulse width modulation (PWM) and/or pulse frequency modulation (PFM) control techniques. While this example depicts the power switches arranged as a full bridge power supply, the teachings of the present disclosure may also apply to half bridge power supply topologies, etc.

The adaptive clamping circuitry 112 is disposed on the secondary side 108 between the power switches 110 and the output voltage Vout (e.g., between the power switches 110 and a load (not shown)). The adaptive clamping circuitry 112 is generally configured to dynamically control the amount of clamping current iclamp that is diverted to the output current iload so that the possibility of a Vds breakdown occurring in the power switches 110 is reduced or eliminated. The clamping current iclamp may discharge the capacitor C1 to generate a clamping voltage (Vc). The adaptive clamping circuitry 112, in some embodiments, is configured to dynamically control the amount of clamping current iclamp based on, at least in part, the input voltage Vin and/or the load current iload. In general, the adaptive clamping circuitry 112 clamps the voltage, Vsw, of the switches 110 (e.g., maintains Vsw at a certain level of voltage). As Vin increases, Vsw will have a tendency to increase. The adaptive clamping circuitry 112 reduces or eliminates low frequency voltage oscillations to avoid exceeding the Vds of the switches 110.

Figure 2:
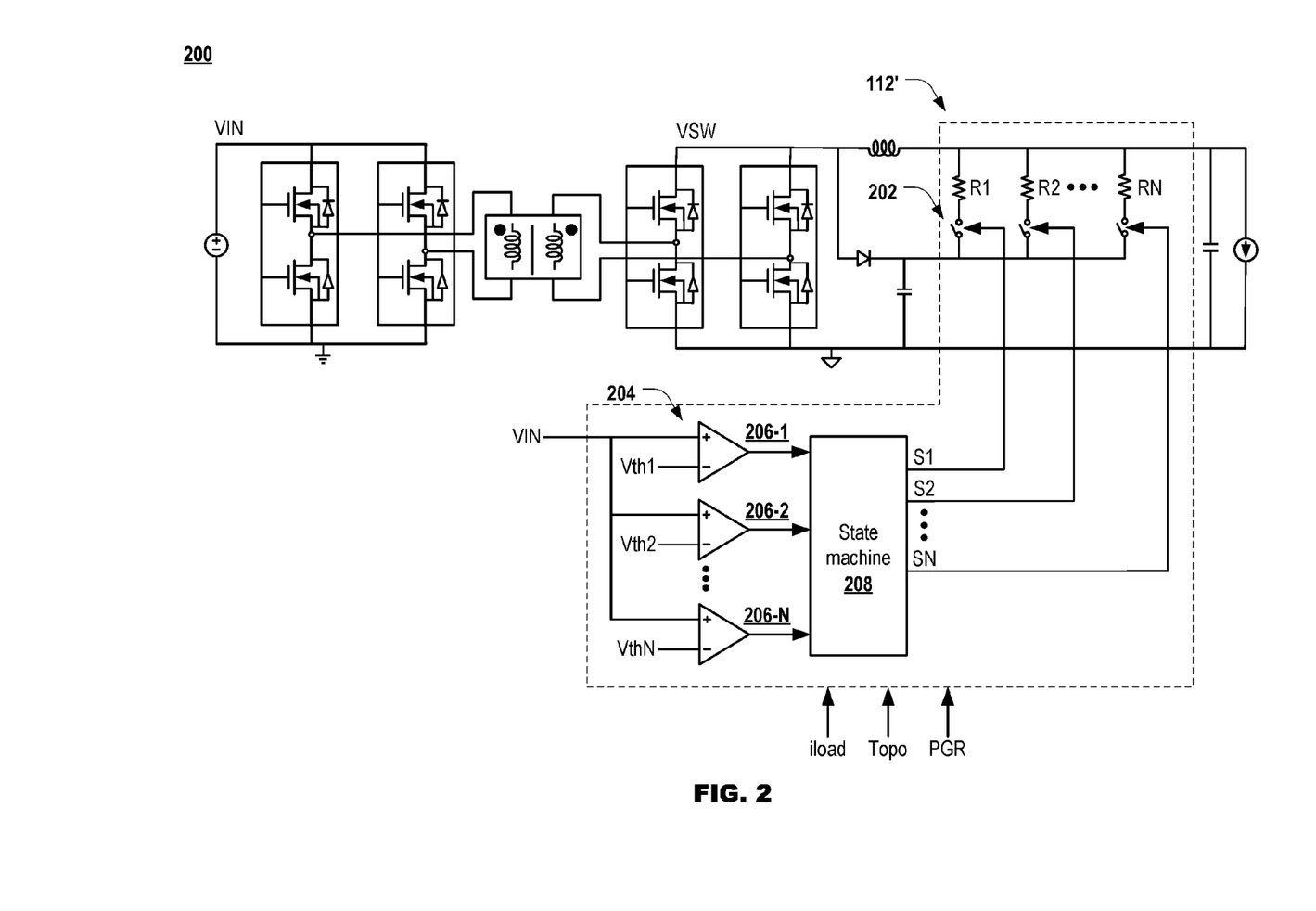
FIG. 2 illustrates a power supply system according to one embodiment of the present disclosure.

FIG. 2 illustrates a power supply system 200 according to at least one embodiment of the present disclosure. Drawing item reference numbers defined in a previous figure (e.g., FIG. 1) are not repeated in subsequent figures (e.g., FIG. 2) for the sake of clarity. Moreover, drawing item reference numbers followed by an apostrophe (e.g., 112') indicate that an example of the particular drawing item is being shown. The illustrated examples are not intended to limit the various embodiments of the present disclosure to any particular manner of implementation. While the various embodiments disclosed below implement a clamping voltage by controlling a clamping current, voltage-based control systems to control clamping voltage are also possible.

The adaptive clamping circuitry 112' of this embodiment comprises at least clamping current generation circuitry and controller circuitry. The clamping current generation circuitry comprises plurality of resistors, R1, R2 . . . RN, in coupled in parallel between the switches 110 of the secondary side 108 and a load (not shown). Each resistor includes a controllable coupling switch 202. The resistors may each have approximately the same resistance value, or a weighted value. The clamping circuitry 112' also comprises controller circuitry 204 that includes a plurality of comparator circuits 206-1, 206-2 . . . 206-N to compare the input voltage Vin to a respective threshold voltage Vth1, Vth2 . . . VthN. The value of threshold voltages Vth1, Vth2 . . . VthN may be selected based on, for example, a desired output voltage range of the power supply system. The number of comparator circuits 206-1, 206-2 . . . 206-N may be selected based on, for example, a desired resolution and/or energy efficiency of the power supply system 200. For each comparator circuit 206-1, 206-2 . . . 206-N, if Vin is less than a respective threshold voltage Vth1, Vth2 . . . VthN, the output of a respective comparator circuit 206-1, 206-2 . . . 206-N may be a first voltage level (e.g., logic 0), and if Vin is greater than a respective threshold voltage Vth1, Vth2 . . . VthN, the output of a respective comparator circuit 206-1, 206-2 . . . 206-N may be a second voltage level (e.g., logic 1). State machine circuitry 208 is configured to receive the output of each respective comparator circuit 206-1, 206-2 . . . 206-N and generate a plurality of switch control signals S1, S2 . . . SN to control a conduction state of switches 202 associated with each of respective resistors R1, R2 . . . RN.

For example, when Vin is relatively low (e.g., compared to the Vds of the switches of the secondary side) the lumped resistance of the resistors R1, R2 . . . RN may be high, and therefore the number of resistors R1, R2 . . . RN coupled to the power supply system 200 via coupling switches 202 is decreased so that the clamping current iclamp is maintained relatively low. For example, as the number of resistors coupled into the power supply system 200 increases, the lumped resistance decreases because the resistors R1, R2 . . . RN are coupled in parallel. When Vin is relatively high (e.g., compared to the Vds of the switches 110 of the secondary side 108), the lumped resistance of the resistors R1, R2 . . . RN may be low, and therefore the number of resistors R1, R2 . . . RN coupled to the power supply system 200 via coupling switches 202 is increased so that the clamping current is relatively high, thus the Vds voltage is reduced and the Vds breakdown of the switches 110 is avoided. In some embodiments, state machine circuitry 208 may comprise logic to control the conduction state of the coupling switches based on, for example, the load current iload (e.g., that is provided to state machine circuitry 208 via sensing circuitry) and/or the specifics of the power supply topology (Topo) which may be, for example, a full bridge topology, a half bridge topology, etc. In at least one embodiment, adaptive clamping circuitry 112' may employ a user programming interface (PGR) to, for example, set the threshold voltages Vth1, Vth2 . . . VthN based on iload and/or Topo. iload and/or Topo may be, for example, user-selectable input values to tune the power supply system 200 for a particular operating environment (e.g., particular circuit configuration, potential input voltages, etc.).

Figure 3:
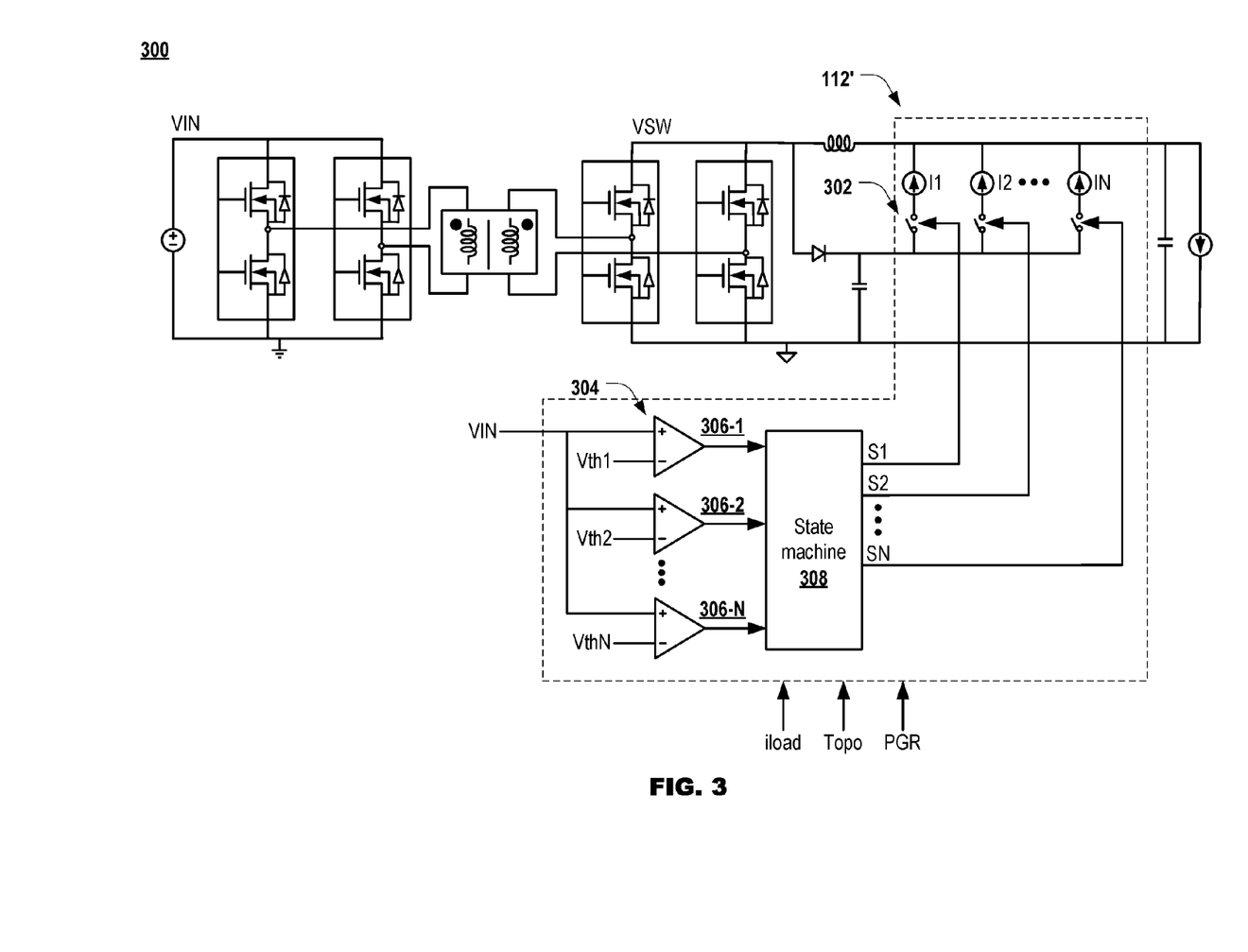
FIG. 3 illustrates a power supply system according to another embodiment of the present disclosure.

FIG. 3 illustrates a power supply system 300 according to another embodiment of the present disclosure. The clamping current generation circuitry in the adaptive clamping circuitry 112' of this embodiment includes a plurality of current sources, I1, I2 . . . IN, coupled in parallel between the switches 110 of the secondary side 108 and a load (not shown). Each current source I1, I2 . . . IN includes a controllable coupling switch 302. The current sources I1, I2 . . . IN may each have the same current value, or a weighted value. Similar to the previous embodiment of FIG. 2, the clamping circuitry 112' also comprises controller circuitry 304 that includes a plurality of comparator circuits 306-1, 302-6 . . . 306-N to compare the input voltage Vin to a respective threshold voltage Vth1, Vth2 . . . VthN. The value of threshold voltages Vth1, Vth2 . . . VthN may be selected based on, for example, a desired output voltage range of the power supply system. The number of comparator circuits 306-1, 306-2 . . . 306-N may be selected based on, for example, a desired resolution and/or energy efficiency of the power supply system 300. For each comparator circuit 306-1, 306-2 . . . 306-N, if the input voltage Vin is less than a respective threshold voltage Vth1, Vth2 . . . VthN, the output of a respective comparator circuit 306-1, 306-2 . . . 306-N may be a first voltage level (e.g., logic 0), and if Vin is greater than a respective threshold voltage Vth1, Vth2 . . . VthN, the output of a respective comparator circuit 306-1, 306-2 . . . 306-N may be a second voltage level (e.g., logic 1). State machine circuitry 308 may comprise logic configured to receive the output of each respective comparator circuit 306-1, 306-2 . . . 306-N and generate a plurality of switch control signals S1, S2 . . . Sn to control a conduction state of switches 302 associated with each of respective current sources I1, I2 . . . IN.

When Vin is relatively low compared to the Vds of the switches 110 of the secondary side 108, the total number of current sources I1, I2 . . . IN coupled to the power supply system 300 via the coupling switches 302 is decreased so that the clamping current iclamp is relatively low. When Vin is relatively high compared to the Vds of the switches 110 of the secondary side 108, the total number of current sources I1, I2 . . . IN coupled to the power supply system 300 via the coupling switches 302 is increased so that the clamping current iclamp is relatively high, thus the Vds breakdown voltage is reduced or eliminated. Similar to the example operations described above regarding FIG. 2, in some embodiments state machine circuitry 308 may control the conduction state of the coupling switches based on, for example, the load current iload and/or Topo.

Figure 4:
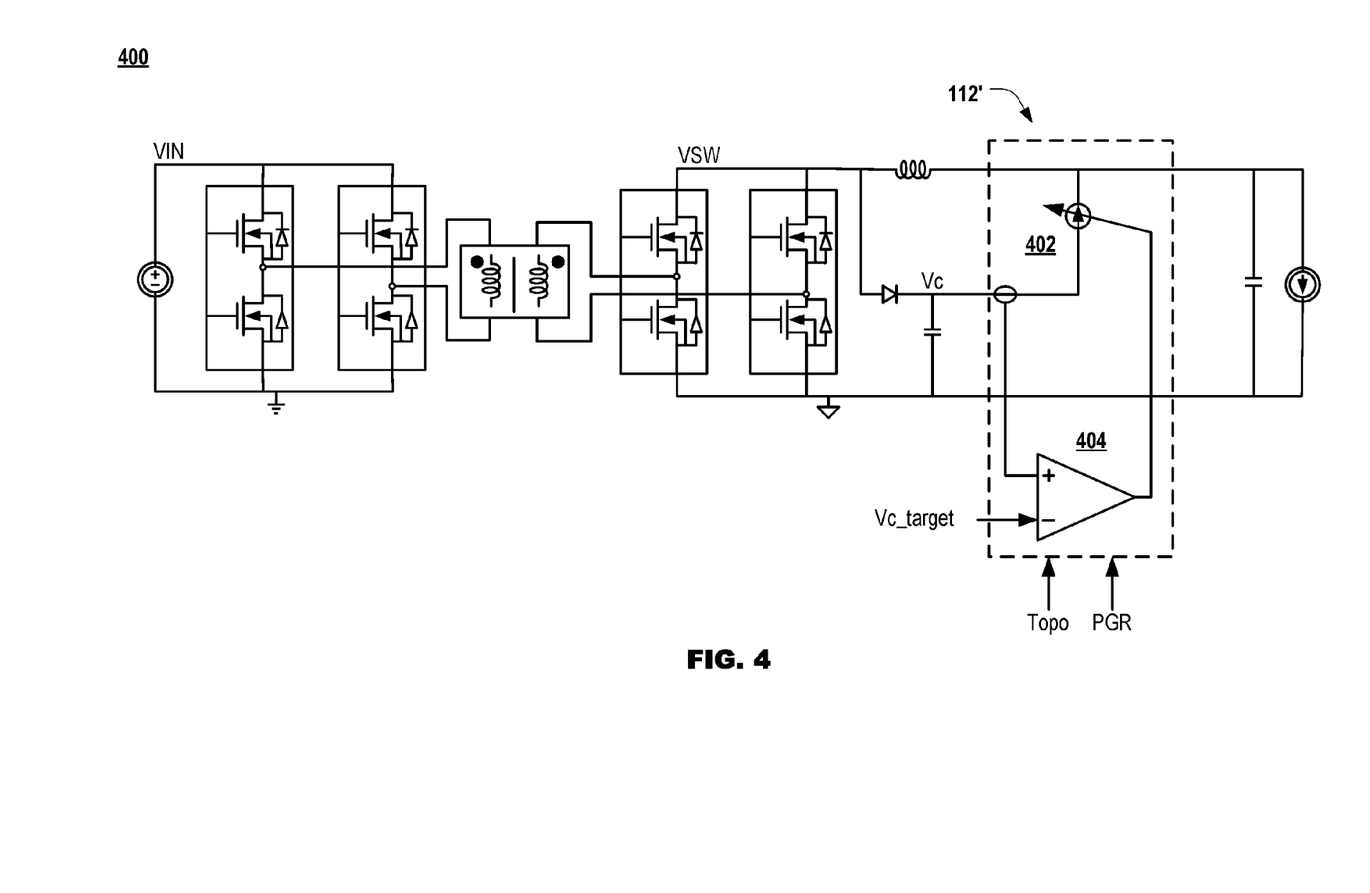
FIG. 4 illustrates a power supply system according to another embodiment of the present disclosure.

FIG. 4 illustrates a power supply system 400 according to another embodiment of the present disclosure. The adaptive clamping circuitry 112' of the embodiment illustrated in FIG. 4 comprises a closed-loop regulator that includes controllable current source 402 operating as the clamping current generation circuitry and operational amplifier circuitry 404 operating as the controller circuitry. In general, the operational amplifier circuitry 404 regulates the loop so that the clamping voltage Vc is generally equal to a target clamping voltage Vc_target. When Vin is relatively low compared to the Vds of the switches of the secondary side, less current may be required from controllable current source 402 to maintain the clamping voltage Vc equal to Vc_target. When Vin is relatively high compared to the Vds of the switches of the secondary side, more current may be required from controllable current source 402 to maintain the clamping voltage Vc equal to Vc_target, and thus the potential of the voltage rising above the Vds breakdown voltage is reduced or eliminated. The value of Vc_target may be based on, for example, characteristics of the switches 110 of the secondary side 108. Similar to the example operations discussed above regarding FIGS. 2 and 3, in some embodiments operational amplifier circuitry 404 may control the controllable current source 402 based on, for example, iload and/or Topo. iload and/or Topo may be user-selectable input values to tune the power supply system 400 for a particular operating environment.

Figure 5:
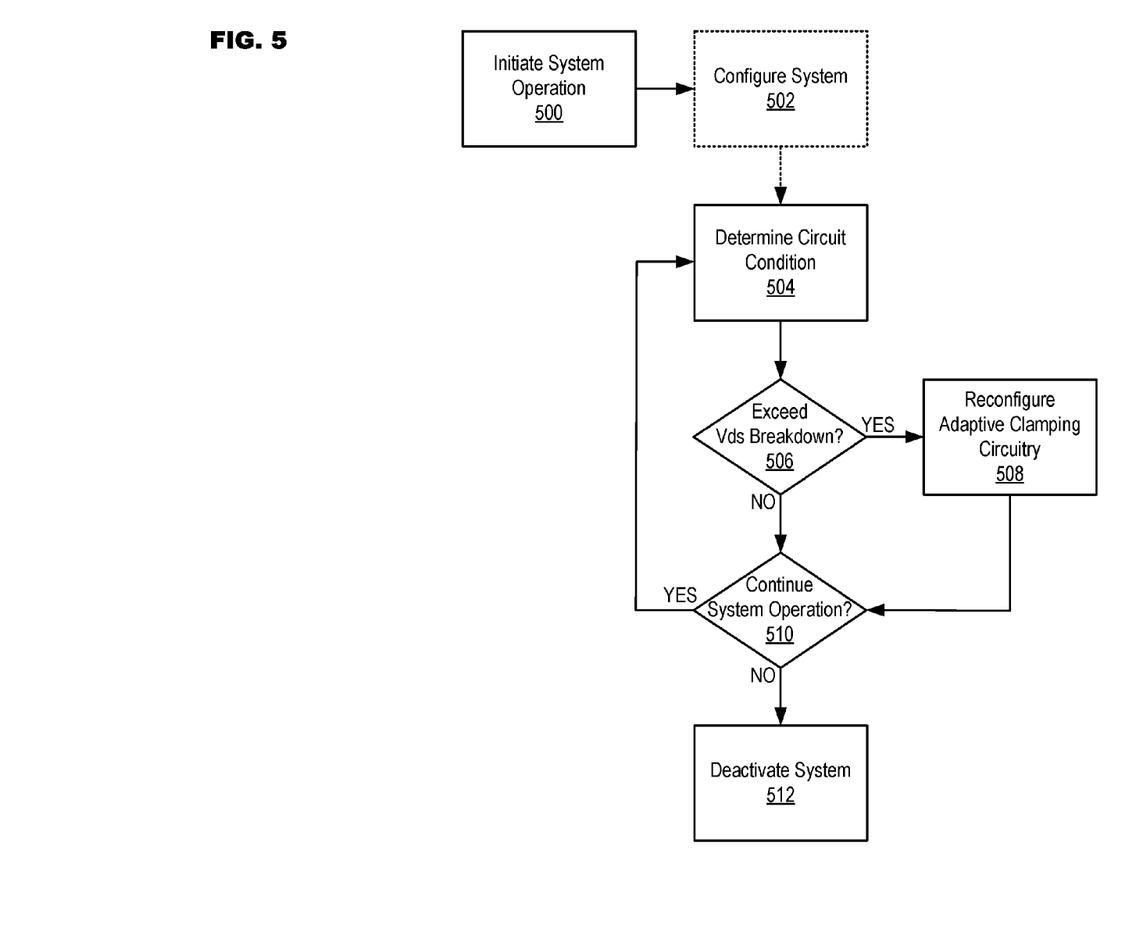
FIG. 5 illustrates example operations to control adaptive clamping circuitry according to another embodiment of the present disclosure.

FIG. 5 illustrates example operations to control adaptive clamping circuitry according to another embodiment of the present disclosure. In operation 500 a power supply system may be initiated. The system may optionally be configured in operation 502. The configuration may be optional in that it may also be possible for the system to be preconfigured during manufacture for specific applications. In at least one embodiment, the configuration may depend on the topology (Topo) of the system. In operation 504 circuit conditions (e.g., the inputs to adaptive clamping circuitry) may be determined. For example, the particular inputs to be determined may depend on, for example, the type of adaptive clamping circuitry being used in the system. For example, if adaptive clamping circuitry such as illustrated in FIG. 2 or FIG. 3 is being employed, then Vin and a variety of threshold voltages may be considered as inputs. If adaptive clamping circuitry such as shown in FIG. 4 is being employed, then Vc and Vc_target may be considered as inputs.

A determination may then be made in operation 506 as to whether there is a potential for the switch voltage of the secondary side switches to exceed their Vds breakdown voltage. If in operation 506 it is determined that there is a potential to exceed the Vds breakdown voltage of the secondary side switches, then in operation 508 the adaptive clamping circuitry may be reconfigured. The reconfiguration may include, for example, causing resistors or current sources to be coupled to the system to increase the clamping current iclamp, causing a controllable current source to be configured to increase the clamping current iclamp, etc. Increasing the clamping current iclamp may cause the switch voltage to be clamped to a level below the Vds of the secondary side switches. A determination in operation 506 that there is not potential to exceed the Vds of the secondary side switches, or operation 508, may be followed by a further determination in operation 510 as to whether to continue system operation. A determination to continue system operation in operation 510 may be followed by a return to operation 504 to reevaluate circuit conditions. A determination in operation 510 not to continue operation may be followed by deactivation of the system in operation 512.

While FIG. 5 illustrates operations according to an embodiment, it is to be understood that not all of the operations depicted in FIG. 5 are necessary for other embodiments. Indeed, it is fully contemplated herein that in other embodiments of the present disclosure, the operations depicted in FIG. 5, and/or other operations described herein, may be combined in a manner not specifically shown in any of the drawings, but still fully consistent with the present disclosure. Thus, claims directed to features and/or operations that are not exactly shown in one drawing are deemed within the scope and content of the present disclosure.

As used in this application and in the claims, a list of items joined by the term "and/or" can mean any combination of the listed items. For example, the phrase "A, B and/or C" can mean A; B; C; A and B; A and C; B and C; or A, B and C. As used in this application and in the claims, a list of items joined by the term "at least one of" can mean any combination of the listed terms. For example, the phrases "at least one of A, B or C" can mean A; B; C; A and B; A and C; B and C; or A, B and C.

As used in any embodiment herein, the terms "system" or "module" may refer to, for example, software, firmware and/or circuitry configured to perform any of the aforementioned operations. Software may be embodied as a software package, code, instructions, instruction sets and/or data recorded on non-transitory computer readable storage mediums. Firmware may be embodied as code, instructions or instruction sets and/or data that are hard-coded (e.g., non-volatile) in memory devices. "Circuitry", as used in any embodiment herein, may comprise, for example, singly or in any combination, hardwired circuitry, programmable circuitry such as computer processors comprising one or more individual instruction processing cores, state machine circuitry, and/or firmware that stores instructions executed by programmable circuitry. The circuitry may, collectively or individually, be embodied as circuitry that forms part of a larger system, for example, an integrated circuit (IC), system on-chip (SoC), desktop computers, laptop computers, tablet computers, servers, smartphones, etc.

Any of the operations described herein may be implemented in a system that includes one or more storage mediums (e.g., non-transitory storage mediums) having stored thereon, individually or in combination, instructions that when executed by one or more processors perform the methods. Here, the processor may include, for example, a server CPU, a mobile device CPU, and/or other programmable circuitry. Also, it is intended that operations described herein may be distributed across a plurality of physical devices, such as processing structures at more than one different physical location. The storage medium may include any type of tangible medium, for example, any type of disk including hard disks, floppy disks, optical disks, compact disk read-only memories (CD-ROMs), compact disk rewritables (CD-RWs), and magneto-optical disks, semiconductor devices such as read-only memories (ROMs), random access memories (RAMs) such as dynamic and static RAMs, erasable programmable read-only memories (EPROMs), electrically erasable programmable read-only memories (EEPROMs), flash memories, Solid State Disks (SSDs), embedded multimedia cards (eMMCs), secure digital input/output (SDIO) cards, magnetic or optical cards, or any type of media suitable for storing electronic instructions. Other embodiments may be implemented as software executed by a programmable control device.

Thus, the present disclosure provides A DC/DC power supply system that includes a primary side and a secondary side to generate an output DC voltage from an input DC voltage. The power supply also includes adaptive clamping circuitry configured to generate an adjustable clamping voltage and/or current to limit a Vds breakdown voltage for a plurality of switches of the secondary side.

The following examples pertain to further embodiments. The following examples of the present disclosure may comprise subject material such as a device, a method, at least one machine-readable medium for storing instructions that when executed cause a machine to perform acts based on the method, means for performing acts based on the method and/or an adaptive clamping circuitry system.

According to a first example there is provided a power supply system. The power supply system may comprise primary side circuitry and a secondary side circuitry to generate an output voltage from an input voltage, at least the secondary side circuitry comprising a plurality of switches and adaptive clamping circuitry to generate at least one of an adjustable clamping current or voltage to prevent a switch voltage for the plurality of switches from exceeding a drain-source (Vds) breakdown voltage.

According to a second example there is provided adaptive clamping circuitry. The adaptive clamping circuitry may comprise clamping current generation circuitry to generate a clamping current to prevent a switch voltage for at least one switch from exceeding a drain-source (Vds) breakdown voltage and controller circuitry to generate control signals to control the operation of the clamping current generation circuitry.

According to a third example there is provided a method for controlling adaptive clamping circuitry. The method may comprise determining a condition of a power supply system including at least plurality of switches on a secondary side of the power supply system to determine if a switch voltage for the plurality of switches could potentially exceed a drain-source (Vds) breakdown voltage and controlling adaptive clamping circuitry in the power supply system to generate at least one of an adjustable clamping current or voltage based on the determination.

The terms and expressions which have been employed herein are used as terms of description and not of limitation, and there is no intention, in the use of such terms and expressions, of excluding any equivalents of the features shown and described (or portions thereof), and it is recognized that various modifications are possible within the scope of the claims. Accordingly, the claims are intended to cover all such equivalents.

What is claimed is:

1. A power supply system, comprising:
   a primary side circuitry and a secondary side circuitry to generate an output voltage from an input voltage, at least the secondary side circuitry comprising a plurality of switches; and
   adaptive clamping circuitry to generate at least one of an adjustable clamping current or voltage based on a result of a comparison of the input voltage to a plurality of threshold voltages to prevent a switch voltage for the plurality of switches from exceeding a drain-source (Vds) breakdown voltage.

2. The power supply system of claim 1, wherein the adaptive clamping circuitry is coupled to the secondary side between the plurality of switches and the output voltage.

3. The power supply system of claim 1, wherein the adaptive clamping circuitry comprises at least clamping current generation circuitry and controller circuitry to generate control signals to control operation of the clamping current generation circuitry.

4. The power supply system of claim 3, wherein the clamping current generation circuitry comprises a plurality of resistors arranged in parallel and switches coupled to each of the plurality of resistors to controllably couple each of the resistors to, or decouple each of the resistors from, the power supply system in response to the control signals.

5. The power supply system of claim 3, wherein the clamping current generation circuitry comprises a plurality of current sources arranged in parallel and switches coupled to each of the plurality of current sources to controllably couple each of the current sources to, or decouple each of the current sources from, the power supply system in response to the control signals.

6. The power supply system of claim 3, wherein the controller circuitry comprises a plurality of operational amplifiers and state machine circuitry.

7. The power supply system of claim 6, wherein each of the plurality of operational amplifiers is to compare the input voltage to a threshold voltage, generate a first voltage level if the input voltage is higher than the threshold voltage and generate a second voltage level if the input voltage is less than the threshold voltage.

8. The power supply system of claim 7, wherein the state machine circuitry comprises logic to generate the control signals based on the voltage levels, wherein the logic is to generate the control signals to prevent the switch voltage for the plurality of switches from exceeding the Vds breakdown voltage.

9. Adaptive clamping circuitry, comprising:
   clamping current generation circuitry to generate a clamping current to prevent a switch voltage for at least one switch from exceeding a drain-source (Vds) breakdown voltage; and
   controller circuitry to generate control signals to control the operation of the clamping current generation circuitry based on a comparison of an input voltage to a plurality of threshold voltages.

10. The adaptive clamping circuitry of claim 9, wherein the clamping current generation circuitry comprises a plurality of resistors arranged in parallel and switches coupled to each of the plurality of resistors to controllably couple each of the resistors to, or decouple each of the resistors from, the power supply system in response to the control signals.

11. The adaptive clamping circuitry of claim 9, wherein the clamping current generation circuitry comprises a plurality of current sources arranged in parallel and switches coupled to each of the plurality of current sources to controllably couple each of the current sources to, or decouple each of the current sources from, the power supply system in response to the control signals.

12. The adaptive clamping circuitry of claim 9, wherein the controller circuitry comprises:
    a plurality of operational amplifiers that each compare the input voltage to a threshold voltage, generate a first voltage level if the input voltage is higher than the threshold voltage and generate a second voltage level if the input voltage is less than the threshold voltage; and
    state machine circuitry including logic to generate the control signals based on the voltage levels, wherein the logic is to generate the control signals to prevent the switch voltage for the at least one switch from exceeding the Vds breakdown voltage.

13. A method for controlling adaptive clamping circuitry comprising:
    determining a condition of a power supply system including at least a plurality of switches on a secondary side of the power supply system to determine if a switch voltage for the plurality of switches could potentially exceed a drain-source (Vds) breakdown voltage; and
    controlling adaptive clamping circuitry in the power supply system to generate at least one of an adjustable clamping current or voltage based on the determination,
    wherein determining a condition of the power supply system comprises comparing an input voltage for the power supply system to a plurality of threshold voltages in the adaptive clamping circuitry.

14. The method of claim 13, wherein controlling the adaptive clamping circuitry comprises causing switches in the adaptive clamping circuitry to controllably couple each of a plurality of resistors or current sources arranged in parallel to the power supply system based on control signals generated by state machine circuitry in the adaptive clamping circuitry.

15. The method of claim 13, wherein controlling the adaptive clamping circuitry comprises controlling a controllable current source in the adaptive clamping circuitry based on a control signal generated by amplifier circuitry in the adaptive clamping circuitry.

16. An adaptive clamping circuit for a power supply, the adaptive clamping circuit comprising:
    a clamp capacitor;
    a clamping current generation circuit that is configured to generate a clamping current from the clamp capacitor to prevent a switch voltage for at least one switch from exceeding a drain-source (Vds) breakdown voltage; and
    a controller circuit that is configured to generate a control signal to adjust the clamping current based on a comparison of an input voltage of the power supply to a threshold voltage;
    wherein the controller circuit comprises a plurality of comparator circuits that each compares the input voltage with one of a plurality of threshold voltages to generate a comparison output that controls the clamping current.

17. The adaptive clamping circuit of claim 16, further comprising:
a plurality of controllable current sources that are controlled according to comparison outputs of the plurality of comparator circuits.

18. The adaptive clamping circuit of claim 16, further comprising:
a plurality of switchable resistors that are controlled according to comparison outputs of the plurality of comparator circuits.

\* \* \* \* \*